(12) United States Patent
Krepski et al.

(10) Patent No.: US 9,260,638 B2
(45) Date of Patent: Feb. 16, 2016

(54) PRESSURE-SENSITIVE ADHESIVES WITH TRIAZINE-EPOXY CROSSLINKING SYSTEM

(75) Inventors: Larry R. Krepski, White Bear Lake, MN (US); Marie Aloshyna ep Lesuffleur, Woodbury, MN (US); Babu N. Gaddam, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 13/990,130

(22) PCT Filed: Nov. 17, 2011

(86) PCT No.: PCT/US2011/061119
§ 371 (c)(1),
(2), (4) Date: May 29, 2013

(87) PCT Pub. No.: WO2012/091817
PCT Pub. Date: Jul. 5, 2012

(65) Prior Publication Data
US 2013/0289219 A1 Oct. 31, 2013

Related U.S. Application Data

(60) Provisional application No. 61/428,088, filed on Dec. 29, 2010.

(51) Int. Cl.
| | |
|---|---|
| C08F 220/18 | (2006.01) |
| C09J 133/02 | (2006.01) |
| C08K 5/3492 | (2006.01) |
| C09J 133/14 | (2006.01) |
| C08F 220/06 | (2006.01) |
| C08F 2/48 | (2006.01) |
| C08L 33/06 | (2006.01) |
| C09J 133/06 | (2006.01) |

(52) U.S. Cl.
CPC .......... *C09J 133/14* (2013.01); *C08F 2/48* (2013.01); *C08L 33/068* (2013.01); *C09J 133/02* (2013.01); *C09J 133/068* (2013.01); *C08F 220/18* (2013.01); *C08K 5/3492* (2013.01)

(58) Field of Classification Search
None
See application file for complete search history.

(56) References Cited

U.S. PATENT DOCUMENTS

| | | |
|---|---|---|
| 3,691,140 A | 9/1972 | Silver |
| 3,931,444 A | 1/1976 | McKenna |
| 4,166,152 A | 8/1979 | Baker |
| 4,329,384 A | 5/1982 | Vesley |
| 4,330,590 A | 5/1982 | Vesley |
| 4,391,687 A | 7/1983 | Vesley |
| 4,636,432 A | 1/1987 | Shibano |
| 4,656,218 A | 4/1987 | Kinoshita |
| 5,045,569 A | 9/1991 | Delgado |
| 5,264,278 A | 11/1993 | Mazurek |
| 5,432,039 A | 7/1995 | Shimokawa |
| 5,506,279 A | 4/1996 | Babu |
| 5,593,615 A | 1/1997 | Nerad |
| 5,708,109 A | 1/1998 | Bennett |
| 5,723,513 A | 3/1998 | Bonham |
| 5,756,584 A | 5/1998 | Bennett |
| 5,883,149 A | 3/1999 | Bennett |
| 5,902,836 A | 5/1999 | Bennett |
| 6,448,337 B1 * | 9/2002 | Gaddam et al. ............... 525/193 |
| 6,994,944 B2 | 2/2006 | Nishimura |
| 8,222,340 B2 | 7/2012 | Erdogan-Haug |
| 8,404,778 B2 | 3/2013 | Erdogan-Haug |
| 2005/0081993 A1 | 4/2005 | Ilkka |
| 2005/0260526 A1 | 11/2005 | Nishimura |
| 2009/0246390 A1 * | 10/2009 | Krepski et al. ............. 427/385.5 |

FOREIGN PATENT DOCUMENTS

| | | |
|---|---|---|
| EP | 0887706 | 12/1998 |
| JP | 07-033855 | 2/1995 |
| JP | H11-258790 | 9/1999 |
| JP | 2000-063684 | 2/2000 |
| JP | 2009-173769 | 8/2009 |
| WO | WO 81/02262 | 8/1981 |
| WO | WO 95/32257 | 11/1995 |
| WO | WO 98/24859 | 6/1998 |
| WO | WO 2005/040296 | 5/2005 |
| WO | WO 2007/087399 | 8/2007 |
| WO | WO 2009/102623 | 8/2009 |
| WO | WO 2010/046240 | 4/2010 |
| WO | WO 2011/025651 | 3/2011 |
| WO | WO 2011/063070 | 5/2011 |
| WO | WO 2011/087664 | 7/2011 |
| WO | WO 2011/090984 | 7/2011 |

OTHER PUBLICATIONS

Czech, "UV-crosslinked Acrylic Pressure-sensitive Adhesive Systems Containing Unsaturated Ethers", Polimery, 2007, vol. 52, No. 6, pp. 438-442.
Pocius, "Adhesion and Adhesives Technology: An Introduction", Second Edition, Carl Hanser Verlag, Munich (2002), Chapter 9, The Chemistry and Physical Properties of Elastomer-based Adhesives, pp. 238-259.
Wakabayashi, "Studies on s-Triazines. I. Cotrimerization of Trichloroacetonitrile with Other Nitriles", Bulletin of the Chemical Society of Japan, Oct. 1969, vol. 42, No. 10, pp. 2924-2931.
Yarbrough, "Contact Angle Analysis, Surface Dynamics, and Biofouling Characteristics of Cross-Linkable, Random Perfluoropolyether-Based Graft Terpolymers", Macromolecules, 2006, vol. 39, No. 7, pp. 2521-2528.
International Search Report for PCT/US2011/061119, 3 pages.

* cited by examiner

*Primary Examiner* — Mark Kaucher
*Assistant Examiner* — Kregg Brooks
(74) *Attorney, Agent, or Firm* — Jean A. Lown

(57) ABSTRACT

A crosslinkable composition is described comprising an acid- and epoxy-functional copolymer, which when crosslinked with a triazine crosslinking agent provides a pressure-sensitive adhesive and pressure-sensitive adhesive articles.

14 Claims, No Drawings

PRESSURE-SENSITIVE ADHESIVES WITH TRIAZINE-EPOXY CROSSLINKING SYSTEM

CROSS REFERENCE TO RELATED APPLICATION

This application claims the benefit of U.S. Provisional Patent Application No. 61/428,088, filed Dec. 29, 2010, the disclosure of which is incorporated by reference herein in its entirety

BACKGROUND

Pressure-sensitive tapes are virtually ubiquitous in the home and workplace. In one of its simplest configuration, a pressure-sensitive tape includes an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted by A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

With broadened use of pressure-sensitive tapes over the years, performance requirements have become more demanding. Shear holding capability, for example, which originally was intended for applications supporting modest loads at room temperature, has now increased substantially for many applications in terms of operating temperature and load. So-called high performance pressure-sensitive tapes are those capable of supporting loads at elevated temperatures (e.g., 70° C.) for 10,000 minutes. Increased shear holding capability has generally been accomplished by crosslinking the PSA, although considerable care must be exercised so that high levels of tack and adhesion are retained in order to preserve the aforementioned balance of properties.

There are two major crosslinking mechanisms for acrylic adhesives: free-radical copolymerization of multifunctional ethylenically unsaturated groups with the other monomers, and covalent or ionic crosslinking through the functional monomers, such as acrylic acid. Another method is the use of UV crosslinkers, such as copolymerizable benzophenones or post-added photocrosslinkers, such as multifunctional benzophenones and triazines. In the past, a variety of different materials have been used as crosslinking agents, e.g., polyfunctional acrylates, acetophenones, benzophenones, and triazines. The foregoing crosslinking agents, however, possess certain drawbacks which include one or more of the following: high volatility; incompatibility with certain polymer systems; generation of corrosive or toxic by-products; generation of undesirable color; requirement of a separate photoactive compound to initiate the crosslinking reaction; and high sensitivity to oxygen. A particular issue for the electronics industry and other applications in which PSAs contact a metal surface is the generation of corrosive or toxic by-products and the generation of undesirable color.

SUMMARY

Briefly, the present disclosure provides a crosslinkable (i.e., pre-adhesive) composition comprising an acid- and epoxy-functional copolymer, which when crosslinked with a chlorinated triazine crosslinking agent provides a pressure-sensitive adhesive composition with fewer of the drawbacks discussed above. Of particular note, a composition of the present disclosure is more acceptable for use in the electronics industry and other applications in which PSAs contact a metal surface because of the smaller amount of crosslinking agent required, which results in a smaller amount of chlorinated reagents used, thereby reducing the potential for the PSA to discolor.

In one embodiment, the present disclosure provides a crosslinkable composition including: an acid- and epoxy-functional (meth)acrylic copolymer of interpolymerized monomers that include: an epoxy-functional (meth)acryloyl monomer; an acid-functional ethylenically unsaturated monomer; and an optional multifunctional (meth)acrylate crosslinker; and a chlorinated triazine crosslinking agent; wherein the epoxy-functional (meth)acryloyl monomer is used in an amount of no greater than 5 parts by weight, and the chlorinated triazine crosslinking agent is used in an amount of no greater than 0.01 part by weight, relative to 100 parts by weight of the total monomer content that would form an unmodified acid-functional (meth)acrylic copolymer (i.e., a copolymer without the epoxy-functional monomer, triazine crosslinker, and multifunctional crosslinker).

In another embodiment, there is provided a crosslinkable composition including: an acid- and epoxy-functional (meth) acrylic copolymer of interpolymerized monomers that include: a (meth)acrylic acid ester of a non-tertiary alcohol; an acid-functional ethylenically unsaturated monomer; an epoxy-functional (meth)acryloyl monomer; an optional non-acid-functional polar monomer; an optional vinyl monomer; and an optional multifunctional (meth)acrylate crosslinker; and a chlorinated triazine crosslinking agent; wherein the epoxy-functional (meth)acryloyl monomer is used in an amount of 0.002 to 5 parts by weight, and the chlorinated triazine crosslinking agent is used in an amount of 0.001 to 0.01 part by weight, relative to 100 parts by weight of the total monomer content that would form an unmodified acid-functional (meth)acrylic copolymer.

In yet another embodiment, there is provided a crosslinkable syrup composition including: a solute polymer that includes a plurality of interpolymerized monomers having pendant acid and epoxy units; a component including at least one free-radically polymerizable solvent monomer; and a chlorinated triazine crosslinking agent; wherein the epoxy-functional monomer (i.e., monomer with pendant epoxy units) is used in an amount of no greater than 5 parts by weight, and the chlorinated triazine crosslinking agent is used in an amount of no greater than 0.01 part by weight, relative to 100 parts by weight of the total monomer content that would form an unmodified acid-functional (meth)acrylic copolymer.

In certain embodiments, an acid- and epoxy-functional (meth)acrylic copolymer includes (in addition to an epoxy-functional (meth)acryloyl monomer) interpolymerized monomers that include: 85 to 99 parts by weight of a (meth)acrylic acid ester of a non-tertiary alcohol; 1 to 15 parts by weight of an acid-functional ethylenically unsaturated monomer; 0 to 10 parts by weight of a non-acid-functional polar monomer; 0 to 5 parts by weight of a vinyl monomer; based on 100 parts by weight of the (meth)acrylic acid ester of a non-tertiary alcohol, an acid-functional ethylenically unsaturated monomer, optional non-acid-functional polar monomer, and an optional vinyl monomer. The (meth)acrylic acid ester of a non-tertiary alcohol, acid-functional ethylenically unsaturated monomer, non-acid-functional polar monomer, and vinyl monomer are examples of monomers that could be used to form an unmodified acid-functional (meth)acrylic copolymer.

The present disclosure also provides pressure-sensitive adhesives prepared from the crosslinkable compositions (e.g., syrup compositions) described herein, as well as pressure-sensitive adhesive articles that include, for example, a coating of such adhesive. The pressure-sensitive adhesives, the crosslinked compositions, of this disclosure provide the desired balance of tack, peel adhesion, and shear holding power, and further conform to the Dahlquist criteria, i.e., the modulus of the adhesive at the application temperature, typically room temperature, is less than $3 \times 10^6$ dynes/cm at a frequency of 1 Hz.

In this application "pre-adhesive" refers to the mixture comprising an acid- and epoxy-functional copolymer and a crosslinking agent that may be crosslinked to form a pressure-sensitive adhesive.

"Syrup composition" refers to a solution of a solute polymer in one or more solvent monomers, the composition having a viscosity of from 500 to 10,000 cPs at 22° C.

Herein, "monomers that would form an unmodified acid-functional (meth)acrylic copolymer" refers to the monomers used to prepare the acid- and epoxy-functional (meth)acrylic copolymer except for the epoxy-functional (meth)acryloyl monomer, triazine crosslinker, and the optional multifunctional (meth)acrylate crosslinker. A (meth)acrylic acid ester of a non-tertiary alcohol, an acid-functional ethylenically unsaturated monomer, a non-acid-functional polar monomer, and a vinyl monomer are examples of monomers that could form an unmodified acid-functional (meth)acrylic copolymer. Such monomers are typically ethylenically unsaturated. Thus, "unmodified" refers to a copolymer that would not have epoxy-functionality, the triazine crosslinker, or the multifunctional chemical crosslinker.

Herein, "(meth)acryloyl" is inclusive of (meth)acrylate and (meth)acrylamide.

Herein, "(meth)acrylic" includes both methacrylic and acrylic.

Herein, "(meth)acrylate" includes both methacrylate and acrylate.

The term "hydrocarbyl" means a saturated or unsaturated linear, branched, cyclic, or polycyclic hydrocarbon group. Unless otherwise indicated, the hydrocarbyl groups typically contain up to 30 carbon atoms, often up to 20 carbon atoms, and even more often up to 10 carbon atoms. This term is used to encompass alkyl, alkenyl, alkynyl groups, as well as cyclic groups such as alicyclic and aromatic groups, for example.

The term "heterohydrocarbyl" means a saturated or unsaturated linear, branched, cyclic, or polycyclic hydrocarbon group (unless otherwise indicated, typically containing up to 30 carbon atoms) having at least one catenary carbon atom replaced by a catenary heteroatom such as O, S, or N.

The term "(hetero)hydrocarbyl" includes both hydrocarbyl and heterohydrocarbyl.

The term "alicyclic group" means a cyclic hydrocarbon group having properties resembling those of aliphatic groups. The term "aromatic group" or "aryl group" means a mono- or polynuclear aromatic hydrocarbon group.

Herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, 2-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

Herein, "alkoxy" refers to an —O-alkyl group.

When a group is present more than once in a formula described herein, each group is "independently" selected, whether specifically stated or not. For example, when more than one R group is present in a formula, each R group is independently selected.

The terms "includes" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As used herein, "a," "an," "the," "at least one," and "one or more" are used interchangeably.

As used herein, the term "or" is generally employed in its usual sense including "and/or" unless the content clearly dictates otherwise. The term "and/or" means one or all of the listed elements or a combination of any two or more of the listed elements.

All numbers are herein assumed to be modified by the term "about" and preferably with the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. The recitation of numerical ranges by endpoints includes all numbers subsumed within that range (e.g., 1 to 5 includes 1, 1.5, 2, 2.75, 3, 3.80, 4, and 5). All parts recited herein, including those in the Example section below, are by weight unless otherwise indicated.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

The present disclosure provides a pre-adhesive composition comprising an acid- and epoxy-functional copolymer, which when crosslinked using a chlorinated triazine crosslinking agent provides a pressure-sensitive adhesive and pressure-sensitive adhesive articles having desirable properties. Preferably, the copolymer is a (meth)acrylic copolymer.

Chlorinated triazine crosslinking agents are highly efficient and reliable UV crosslinkers and often used to prepare high performance PSAs. They are oxygen tolerant, have scavenging ability, and are able to cure (meth)acrylic compositions under low intensity light irradiation. However, the presence of chlorinated reagents can be undesirable in the electronics industry as well as in other applications such as medical tapes. Thus, reducing the amount of a chlorinated triazine crosslinking agent is desirable in certain situations. The present disclosure describes a new way to obtain high performance PSAs using a very low level of a chlorinated triazine crosslinking agent with an acid- and epoxy-functional copolymer (e.g., isooctyl acrylate/acrylic acid/glycidyl methacrylate (IOA/AA/GMA) copolymer). Without being bound by theory, it is believed that the chlorinated triazine crosslinking agent functions as a UV crosslinker in the usual manner, and it activates the epoxy ring in one polymer chain in-situ toward an acid group in another polymer chain to produce a crosslinked polymer.

The chlorinated triazine crosslinking agent is generally used in an amount of no greater than 0.01 part by weight relative to 100 parts by weight of the total monomer content used to prepare the acid- and epoxy-functional (meth)acrylic copolymer (other than the epoxy-functional (meth)acryloyl monomer, the triazine crosslinking agent, and the multifunctional (meth)acrylate crosslinker (if used)). In certain embodiments, only up to 0.005 part by weight of the chlorinated triazine crosslinking agent is used. This is significantly lower than the amount used in typical acrylate crosslinking reactions. For example, a typical acrylate adhesive polymer is formulated with 0.1 weight percent of a chlorinated triazine crosslinking agent. The systems described in this disclosure provide polymers with excellent adhesive properties but with greatly reduced use of chlorinated reagents.

The chlorinated triazine crosslinking agent is preferably a photo-crosslinking agent. More preferably, the triazine crosslinking agent is a chromophore-substituted chloro-methyl-s-triazine crosslinking agent.

In one embodiment, the crosslinking agent is as described in U.S. Pat. No. 4,330,590 (Vesley), and is of the formula:

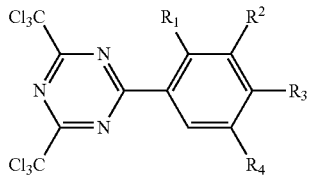

wherein: $R^1$, $R^2$, $R^3$, and $R^4$ are independently hydrogen, alkyl, or alkoxy; and 1-3 of the $R^1$, $R^2$, $R^3$, and $R^4$ groups are hydrogen. Preferably, the alkyl and alkoxy groups have no more than 12 carbon atoms, and often no more than 4 carbon atoms. Preferably, both $R^2$ and $R^3$ are alkoxy, because this tends to provide shorter reaction times. Adjacent alkoxy substituents may be interconnected to form a ring. The photoactive s-triazine component may be prepared by the co-trimerization of an aryl nitrile with trichloroacetonitrile in the presence of HCl gas and a Lewis acid such as $AlCl_3$, $AlBr_3$, etc., as described in Bull. Chem. Soc. Japan, Vol. 42, page 2924 (1969).

In another embodiment, the crosslinking agent is as described in U.S. Pat. No. 4,329,384 (Vesley), and is of the formula:

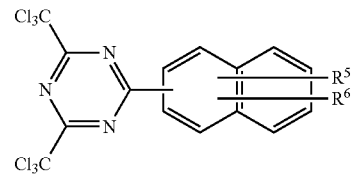

wherein: $R^5$ and $R^6$ are independently hydrogen, alkyl, or alkoxy. By this representation, it is meant that $R^5$ and $R^6$ can be on either of the fused rings. Preferably, any alkyl or alkoxy group of the photoactive s-triazine component has no more than 12 carbon atoms, and no more than two alkyl and alkoxy groups have more than 6 carbon atoms. In certain embodiments, they have no more than 4 carbon atoms, and the alkyl is often methyl or ethyl, and the alkoxy is often methoxy or ethoxy. Adjacent alkoxy substituents may be interconnected to form a ring. The photoactive s-triazine component may be prepared by the co-trimerization of a polynuclear nitrile with trichloroacetonitrile in the presence of HCl gas and a Lewis acid such as $AlCl_3$, $AlBr_3$, etc. as described in Bull. Chem. Soc. Jap., Vol. 42, pages 2924-2930 (1969).

Examples of suitable chlorinated triazine crosslinking agents include, but are not limited to, 2,4-bis(trichloromethyl)-6-(4-methoxy)phenyl)-s-triazine; 2,4-bis(trichloromethyl)-6-(3,4-dimethoxy)phenyl)-s-triazine; 2,4-bis(trichloromethyl)-6-(3,4,5-trimethoxy)phenyl)-s-triazine; 2,4-bis(trichloromethyl)-6-(2,4-dimethoxy)phenyl)-s-triazine; 2,4-bis(trichloromethyl)-6-(3-methoxy)phenyl)-s-triazine as described in U.S. Pat. No. 4,330,590 (Vesley), and 2,4-bis(trichloromethyl)-6-naphthenyl-s-triazine and 2,4-bis(trichloromethyl)-6-(4-methoxy)naphthenyl-s-triazine as described in U.S. Pat. No. 4,329,384 (Vesley).

The chlorinated triazine crosslinking agent is preferably a photo-crosslinking agent. More preferably, the triazine crosslinking agent is a chromophore-substituted chloro-methyl-s-triazine crosslinking agent, which can be prepared according to Wakabayashi et al., Bull. Chem. Soc. Jap., Vol. 42, pages 2924-2930 (1969).

The chlorinated triazine crosslinking agent is generally used in an amount of no greater than 0.01 part by weight, relative to 100 parts by weight of the total monomer content used to prepare the acid- and epoxy-functional (meth)acrylic copolymer (other than the epoxy-functional (meth)acryloyl monomer, triazine crosslinker, and multifunctional (meth)acrylate crosslinker (if used)). It will be understood that the amount of the chlorinated triazine crosslinking agent is provided in an amount relative to 100 parts of the monomers used that would form, if it were prepared, what is referred to herein as "an unmodified acid-functional (meth)acrylic copolymer"—this is the total content of monomers except for the epoxy-functional (meth)acryloyl monomer, triazine crosslinking agent, and multifunctional (meth)acrylate crosslinker (if used). In certain embodiments, no greater than 0.005 part by weight of the chlorinated triazine crosslinking agent is used, relative to 100 parts by weight of the total monomer content that would form an unmodified acid-functional (meth)acrylic copolymer. Typically, at least 0.001 part by weight is used, relative to 100 parts by weight of the total monomer content that would form an unmodified acid-functional (meth)acrylic copolymer. The acid- and epoxy-functional (meth)acrylic copolymer is prepared from monomers that include an epoxy-functional (meth)acryloyl monomer and an acid-functional ethylenically unsaturated monomer. Other monomers that can be used include, for example, a (meth)acrylic acid ester of a non-tertiary alcohol (i.e., a (meth)acrylate ester monomer), a second, non-acid-functional polar monomer, a vinyl monomer, and a multifunctional (meth)acrylate.

An exemplary epoxy-functional (meth)acryloyl monomer is of the formula:

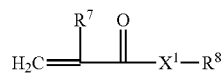

wherein:
R$^7$ is —H or —CH$_3$;
X$^1$ is —NR$^9$— or —O—;
R$^8$ is an epoxy-substituted hydrocarbyl group; and
R$^9$ is —H or a C$_1$-C$_4$ alkyl.

Preferably, the R$^8$ group is based on a straight-chain, branched, cyclic or polycyclic hydrocarbon of 2 to 30 carbons having an oxirane (epoxy) group included. More preferably, the R$^8$ group contains 3 to 10 carbons, such as glycidyl methacrylate (GMA). Some embodiments contain an epoxycyclohexyl group such as 3,4-epoxycyclohexylmethyl(meth)acrylate and 3-(2,3-epoxypropoxy)phenyl acrylate, 2-[4-(2,3-epoxypropoxy)phenyl]-2-(4-acryloyloxy-phenyl)propane, 4-(2,3-epoxypropoxy)cyclohexyl acrylate, 2,3-epoxycyclohexyl acrylate, and the acrylic acid monoester of poly (Bisphenol-A diglycidyl ether), commercially available as EBECRYL 3605, from Rad-Cure Corp., Fairfield, N.J., and species having R$^8$ according to the formula:
—[(CH$_2$)$_5$C(O)O]$_n$—CH$_2$-epoxycyclohexyl, wherein n is 0 to 10 and preferably 1-4. Epoxy-functional (meth)acrylate monomers useful in the disclosure include the acrylic acid monoester of poly(Bisphenol-A diglycidyl ether), commercially available as EBECRYL 3605, from Rad-Cure Corp., Fairfield, N.J., and the polyesters comprising (meth)acrylic acid, caprolactone or valerolactone or cyclooctanone lactone, and epoxidized cyclohexane derivatives such as 3,4-epoxycyclohexylmethanol, 3,4-epoxycyclohexane carboxylic acid, and 4,5-epoxycyclohexane-1,2-dicarboxylic acid.

Some preferred epoxy monomers are of the formula:

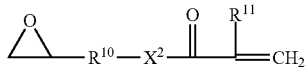

wherein:
R$^{10}$ is a (hetero)hydrocarbyl group, preferably a hydrocarbyl group;
R$^{11}$ is —H or —CH$_3$;
X$^2$ is —NR$^{12}$— or —O—, and
R$^{12}$ is —H or a C$_1$-C$_4$ alkyl.

The epoxy-functional (meth)acryloyl monomer is used in an amount of no greater than 5 parts by weight, relative to 100 parts by weight of the total monomer content of an unmodified acid-functional (meth)acrylic copolymer. In certain embodiments, the epoxy-functional (meth)acryloyl monomer is used in an amount of at least 0.002 part, at least 0.01 part, or at least 0.05 part by weight, relative to 100 parts by weight of the total monomer content that would form an unmodified acid-functional (meth)acrylic copolymer. In certain embodiments, no more than 1 part by weight is used, and in other embodiments, no more than 0.5 part by weight is used, relative to 100 parts by weight of the total monomer content that would form an unmodified acid-functional (meth)acrylic copolymer.

As mentioned above, other monomers that can be used in making an (meth)acrylic copolymer for use in the present disclosure include those typically used in acrylic PSAs. These include, for example, a (meth)acrylic acid ester of a non-tertiary alcohol (i.e., a (meth)acrylate ester monomer), an acid-functional ethylenically unsaturated monomer, a second, non-acid-functional polar monomer, and a vinyl monomer. Furthermore, a multifunctional (meth)acrylate can be used in the (meth)acrylic copolymer to assist in additional crosslinking and adhesive property enhancement.

A (meth)acrylate ester monomer useful in preparing the acid- and epoxy-functional (meth)acrylic copolymer is a monomeric (meth)acrylic acid ester of a non-tertiary alcohol, which alcohol contains from 1 to 14 carbon atoms and preferably an average of from 4 to 12 carbon atoms.

Examples of monomers suitable for use as the (meth)acrylate ester monomer include an esters of either acrylic acid or methacrylic acid with a non-tertiary alcohol such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomer are suitable. In some embodiments, the preferred (meth) acrylate ester monomer is the ester of (meth)acrylic acid with an alcohol derived from a renewable sources, such as 2-octanol, citronellol or dihydrocitronellol.

The isooctyl acrylate used in the examples was obtained from 3M (St. Paul, Minn.) and is available from a number of other suppliers including Sigma-Aldrich (St. Louis Mo.), Sartomer (Exton, Pa.) and Monomer Polymer and Dajac Laboratories (Feasterville, Pa.).

In some embodiments, it is desirable for the (meth)acrylic acid ester monomer component include a high Tg monomer, have a Tg of at least 25° C., and preferably at least 50° C. As used herein, the term "Tg" of a monomer refers to the glass transition temperature of a homopolymer prepared from that monomer. Suitable high Tg monomers include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations.

The (meth)acrylate ester monomer is typically used in an amount of 85 to 99 parts by weight, based on 100 parts by weight of the total monomer content that would form an unmodified acid-functional (meth)acrylic copolymer. Preferably, the (meth)acrylate ester monomer is used in an amount of 90 to 95 parts by weight of the 100 parts of the total monomer content that would form an unmodified acid-functional (meth)acrylic copolymer. When high Tg monomers are included, the copolymer may include up to 30 parts by weight, preferably up to 20 parts by weight of the 85 to 99 parts by weight of (meth)acrylate ester monomer component.

The (meth)acrylic copolymer typically further includes an acid-functional ethylenically unsaturated monomer, where the acid-functional group may be an acid per se, such as a carboxylic acid, or a portion may be salt thereof, such as an alkali metal carboxylate. Useful acid-functional ethylenically unsaturated monomers include, but are not limited to, those selected from an ethylenically unsaturated carboxylic acid, ethylenically unsaturated sulfonic acid, ethylenically unsaturated phosphonic acid, and mixtures thereof. Examples of such compounds include those selected from acrylic acid, methacrylic acid, itaconic acid, fumaric acid, crotonic acid, citraconic acid, maleic acid, oleic acid, β-carboxyethyl(meth) acrylate, 2-sulfoethyl methacrylate, styrene sulfonic acid, 2-acrylamido-2-methylpropanesulfonic acid, vinylphosphonic acid, and mixtures thereof.

Due to their availability, acid-functional ethylenically unsaturated monomers of the acid- and epoxy-functional (meth)acrylic copolymer are generally selected from ethylenically unsaturated carboxylic acids, i.e., (meth)acrylic acids. When an even stronger acid is desired, an acid-functional ethylenically unsaturated monomer includes an ethylenically unsaturated sulfonic acid, an ethylenically unsaturated phosphonic acid, or a mixture thereof.

The acid-functional ethylenically unsaturated monomer is generally used in an amount of at least 1 part by weight, based on 100 parts by weight of the total monomer content that would form an unmodified acid-functional (meth)acrylic copolymer. The acid-functional ethylenically unsaturated monomer is generally used in an amount of no greater than 15 parts by weight, and often no greater than 10 parts by weight of the 100 parts of the total monomer content that would form an unmodified acid-functional (meth)acrylic copolymer. In certain embodiments, at least 2 parts by weight of an acid-functional ethylenically unsaturated monomer is used for more efficient ring opening of the epoxy group. In certain embodiments, 1 part to 15 parts by weight acid-functional ethylenically unsaturated monomer is used, based on 100 parts by weight of the total monomer content that would form an unmodified acid-functional (meth)acrylic copolymer.

In certain embodiments, a non-acid-functional polar monomer is used in making the acid- and epoxy-functional (meth)acrylic copolymer. As used herein, the term "polar monomer" is exclusive of an acid-functional ethylenically unsaturated monomer, and is referred to as a "non-acid-functional polar monomer."

Representative examples of a suitable non-acid-functional polar monomer includes, but is not limited, to 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl)(meth)acrylates including 2-(2-ethoxyethoxy)ethyl(meth)acrylate, 2-ethoxyethyl (meth)acrylate, 2-methoxyethoxyethyl(meth)acrylate, 2-methoxyethyl methacrylate, polyethylene glycol mono (meth)acrylates; alkyl vinyl ethers, including vinyl methyl ether; and mixtures thereof. Preferred polar monomers include those selected from the group consisting of 2-hydroxyethyl(meth)acrylate and N-vinylpyrrolidinone.

A non-acid-functional polar monomer may be used in an amount of 0 to 10 parts by weight, based on 100 parts by weight of the total monomer content that would form an unmodified acid-functional (meth)acrylic copolymer. In certain embodiments, such monomer is used in an amount of at least 0.5 part by weight of the 100 parts of the total monomer content that would form an unmodified acid-functional (meth)acrylic copolymer. In certain embodiments, such monomer is used in an amount of no greater than 5 parts by weight of the 100 parts of the total monomer content that would form an unmodified acid-functional (meth)acrylic copolymer.

When used, vinyl monomers useful in the (meth)acrylic copolymer include a vinyl ester (e.g., vinyl acetate and vinyl propionate), styrene, substituted styrene (e.g., α-methyl styrene), vinyl halide, and mixtures thereof. As used herein, the term "vinyl monomer" is exclusive of an acid-functional ethylenically unsaturated monomer, an acrylate ester monomer, and a polar monomer.

A vinyl monomer may be used in an amount of 0 to 5 parts by weight, based on 100 parts by weight of the total monomer content that would form an unmodified acid-functional (meth)acrylic copolymer. In certain embodiments, such monomer is used in an amount of at least 1 part by weight of the 100 parts of the total monomer content that would form an unmodified acid-functional (meth)acrylic copolymer.

In order to increase cohesive strength of the coated adhesive composition, a multifunctional (meth)acrylate monomer may be incorporated into the blend of polymerizable monomers to assist in crosslinking. Such compounds are often referred to as chemical crosslinking agents. A multifunctional (meth)acrylate is particularly useful for emulsion or syrup polymerization. Examples of useful multifunctional (meth) acrylates include, but are not limited to, di(meth)acrylates, tri(meth)acrylates, and tetra(meth)acrylates, such as 1,6-hexanediol di(meth)acrylate, poly(ethylene glycol) di(meth) acrylates, polybutadiene di(meth)acrylate, polyurethane di(meth)acrylates, and propoxylated glycerin tri(meth)acrylate, and mixtures thereof. The amount and identity of multifunctional (meth)acrylate is tailored depending upon application of the adhesive composition.

If used, typically, a multifunctional (meth)acrylate is used in an amount of less than 5 parts by weight, relative to 100 parts by weight of the total monomer content that would form an unmodified acid-functional (meth)acrylic copolymer. In certain embodiments, a multifunctional (meth)acrylate crosslinker may be present in an amount of less than 1 part by weight. In certain embodiments, such chemical crosslinker is used in an amount of at least 0.01 part by weight. In certain embodiments, such chemical crosslinker is used in an amount of at least 0.05 part by weight. In some embodiments the crosslinking compositions contain no multifunctional (meth) acrylates.

An acid- and epoxy-functional (meth)acrylic copolymer can be prepared by a conventional free radical polymerization method, including solution, radiation, bulk, dispersion, emulsion, and suspension processes. For example, it may be prepared via suspension polymerizations as disclosed in U.S. Pat. No. 3,691,140 (Silver); U.S. Pat. No. 4,166,152 (Baker et al.); U.S. Pat. No. 4,636,432 (Shibano et al.); U.S. Pat. No. 4,656,218 (Kinoshita); and U.S. Pat. No. 5,045,569 (Delgado). Each describes adhesive compositions, and the descriptions of polymerization processes.

One method of preparing acid- and epoxy-functional (meth)acrylic copolymers includes partially polymerizing monomers to produce a syrup composition comprising the acid- and epoxy-functional (meth)acrylic copolymer and unpolymerized monomers. The syrup composition is polymerized to a useful coating viscosity, which may be coated onto a substrate (such as a tape backing) and further polymerized. Partial polymerization provides a coatable solution of the acid- and epoxy-functional (meth)acrylic solute polymer in one or more free-radically polymerizable solvent monomers. Generally, the chlorinated triazine crosslinking agent is added to the partially polymerized composition, then coated on a suitable substrate and further polymerized.

Thus, herein a crosslinkable composition can be described as including an acid- and epoxy-functional (meth)acrylic copolymer, optionally with unreacted monomers, and a triazine crosslinking agent. Alternatively, the crosslinkable composition can be described as a crosslinkable syrup composition that includes a solute polymer comprising a plurality of polymerized monomer units comprising pendant acid and epoxy (or oxirane) units, a component comprising at least one free-radically polymerizable solvent monomer (i.e., unreacted monomer), a chlorinated triazine crosslinking agent, and optionally a multifunctional (meth)acrylate chemical crosslinking agent.

The polymerizations may be conducted in the presence of, or preferably in the absence of, suitable solvents such as ethyl acetate, toluene and tetrahydrofuran, which are unreactive with the functional groups of the components of the syrup composition.

Polymerization can be accomplished by exposing the syrup composition to energy in the presence of a photoinitiator. Energy activated initiators may be unnecessary where, for example, ionizing radiation is used to initiate polymerization. Typically, a photoinitiator can be employed in a concentration of at least 0.0001 part by weight, preferably at least 0.001 part by weight, and more preferably at least 0.005 part by weight, relative to 100 parts by weight of the solvent monomer(s) of the unmodified acid-functional (meth)acrylic copolymer. Typically, a photoinitiator can be employed in a concentration of no more than 3.0 parts by weight, preferably no more than 1.0 part by weight, and more preferably no more than 0.5 part by weight, relative to 100 parts by weight of the total monomer content that would form an unmodified acid-functional (meth)acrylic copolymer. A preferred method of preparation of the syrup composition is photoinitiated free radical polymerization. Advantages of the photopolymerization method are that 1) heating the monomer solution is unnecessary and 2) photoinitiation is stopped completely when the activating light source is turned off. Polymerization to achieve a coatable viscosity may be conducted such that the conversion of monomers to polymer is up to about 30%. Polymerization can be terminated when the desired conversion and viscosity have been achieved by removing the light source and by bubbling air (oxygen) into the solution to quench propagating free radicals. The solute polymer(s) may be prepared conventionally in a non-monomeric solvent and advanced to high conversion (degree of polymerization). When solvent (monomeric or non-monomeric) is used, the solvent may be removed (for example by vacuum distillation) either before or after formation of the syrup composition. While an acceptable method, this procedure involving a highly converted functional polymer is not preferred because an additional solvent removal step is required, another material may be required (a non-monomeric solvent), and dissolution of the high molecular weight, highly converted solute polymer in the monomer mixture may require a significant period of time.

Useful photoinitiators include benzoin ethers such as benzoin methyl ether and benzoin isopropyl ether; substituted acetophenones such as 2,2-dimethoxyacetophenone, available the trade name IRGACURE 651 photoinitiator (BASF Corporation; Florham Park, N.J.), 2,2 dimethoxy-2-phenyl-1-phenylethanone, available under the trade name ESACURE KB-1 photoinitiator (Sartomer Co., West Chester, Pa.), and dimethylhydroxyacetophenone; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl)oxime. Particularly preferred among these are the substituted acetophenones.

Preferred photoinitiators are photoactive compounds that undergo a Norrish I cleavage to generate free radicals that can initiate by addition to the acrylic double bonds. The photoinitiator can be added to the mixture to be coated after the copolymer has been formed, i.e., photoinitiator can be added to the syrup composition. Such polymerizable photoinitiators are described, for example, in U.S. Pat. Nos. 5,902,836 and 5,506,279 (B. N. Gaddam et al.).

The syrup composition and the photoinitiator may be irradiated with activating UV radiation to polymerize the monomer component(s). UV light sources can be of two types: 1) relatively low light intensity sources such as Blacklights which provide generally 10 mW/cm$^2$ or less (as measured in accordance with procedures approved by the United States National Institute of Standards and Technology as, for example, with a UVIMAP UM 365 L-S radiometer manufactured by Electronic Instrumentation & Technology, Inc., in Sterling, Va.) over a wavelength range of 280 to 400 nanometers; and 2) relatively high light intensity sources such as medium pressure mercury lamps which provide intensities generally greater than 10 mW/cm$^2$, preferably 15 to 450 mW/cm$^2$. Where actinic radiation is used to fully or partially polymerize the syrup composition, high intensities and short exposure times are preferred. For example, an intensity of 600 mW/cm$^2$ and an exposure time of about 1 second may be used successfully. Intensities can range from 0.1 to 150 mW/cm$^2$, preferably from 0.5 to 100 mW/cm$^2$, and more preferably from 0.5 to 50 mW/cm$^2$. Such photoinitiators preferably are present in an amount of from 0.1 to 1.0 part by weight, relative to 100 parts by weight of the total monomer content that would form an unmodified acid-functional (meth)acrylic copolymer.

Accordingly, relatively thick coatings (e.g., at least about 1 mil or 25.4 micrometers) can be achieved when the extinction coefficient of the photoinitiator is low.

The degree of conversion can be monitored during the irradiation by measuring the index of refraction of the polymerizing medium as previously described. Useful coating viscosities are achieved with conversions (i.e., the percentage of available monomer polymerized) in the range of up to 30%, preferably 2% to 20%, more preferably from 5% to 15%, and most preferably from 7% to 12%. The molecular weight (weight average) of the solute polymer(s) is at least 100,000, preferably at least 500,000.

When preparing acid- and epoxy-functional (meth)acrylic copolymers described herein, it is expedient for the photoinitiated polymerization reactions to proceed to virtual completion, i.e., depletion of the monomeric components, at temperatures less than 70° C. (preferably at 50° C. or less) with reaction times less than 24 hours, preferably less than 12 hours, and more preferably less than 6 hours. These temperature ranges and reaction rates obviate the need for free radical polymerization inhibitors, which are often added to acrylic systems to stabilize against undesired, premature polymerization and gelation. Furthermore, the addition of inhibitors adds extraneous material that will remain with the system and inhibit the desired polymerization of the syrup composition and formation of the crosslinked pressure-sensitive adhesives. Free radical polymerization inhibitors are often required at processing temperatures of 70° C. and higher for reaction periods of more than 6 to 10 hours.

In some embodiments, the acid- and epoxy-functional (meth)acrylic copolymers may be prepared by solution methods. A typical solution polymerization method is carried out by adding the monomers, a suitable solvent, and an optional chain transfer agent to a reaction vessel, adding a free radical initiator, purging with nitrogen, and maintaining the reaction vessel at an elevated temperature, typically in the range of 40° C. to 100° C. until the reaction is completed, typically in 1 to 20 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

It is preferable to coat the adhesive composition soon after preparation. The adhesive polymer composition (containing the copolymer, monomers, and crosslinking agent), either as a syrup or solution, are easily coated upon suitable substrates, such as flexible backing materials, by conventional coating techniques, then further polymerized, and cured, to produce adhesive coated sheet materials. The flexible backing material may be any material conventionally utilized as a tape backing, optical film, or any other flexible material.

A pressure-sensitive adhesive composition may also contain one or more conventional additives. Preferred additives include tackifiers, plasticizers, dyes, antioxidants, and UV stabilizers. Such additives can be used if they do not affect the superior properties of the emulsion pressure-sensitive adhesives.

If tackifiers are used, then up to 50% by weight, preferably less than 30% by weight, and more preferably less than 5% by weight, based on the dry weight of the total adhesive polymer would be suitable. In some embodiments no tackifier is used. Suitable tackifiers for use with (meth)acrylate polymer dispersions include a rosin acid, a rosin ester, a terpene phenolic resin, a hydrocarbon resin, and a cumarone indene resin. The type and amount of tackifier can affect properties such as contactability, bonding range, bond strength, heat resistance and specific adhesion.

Adhesive articles may be prepared by coating the adhesive or pre-adhesive composition of a suitable support, such as a flexible backing. Examples of materials that can be included in the flexible backing include polyolefins such as polyethylene, polypropylene (including isotactic polypropylene), polystyrene, polyester, polyvinyl alcohol, poly(ethylene terephthalate), poly(butylene terephthalate), poly(caprolactam), poly(vinylidene fluoride), polylactides, cellulose acetate, and ethyl cellulose and the like. Commercially available backing materials useful in the disclosure include HOSTAPHAN 3SAB, primed polyester film (available from Mitsubishi Polyester Film Inc., Greer, S.C.), kraft paper (available from Monadnock Paper, Inc.); cellophane (available from Flexel Corp.); spun-bond poly(ethylene) and poly (propylene), such as TYVEK and TYPAR (available from DuPont, Inc.); and porous films obtained from poly(ethylene) and poly(propylene), such as TESLIN (available from PPG Industries, Inc.), and CELLGUARD (available from Hoechst-Celanese).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metalized polymer films, or ceramic sheet materials may take the form of any article conventionally known to be utilized with pressure-sensitive adhesive compositions such as labels, tapes, signs, covers, marking indicia, and the like.

The above-described compositions can be coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary as previously described. The solutions may be of any desirable concentration, and degree of conversion, for subsequent coating, but is typically 20 to 70 weight percent (wt-%) polymer solids, and more typically 30 to 50 wt-% solids, in solvent. The emulsions also may be of any desirable concentration for subsequent coating, but is typically 30 to 70 wt-% polymer solids, and generally contains less than 2% unreacted monomer. The syrup composition may be of any desirable concentration for subsequent coating, but is typically 5 to 20 wt-% polymer solids in monomer. The desired concentration may be achieved by further dilution of the coating composition, or by partial drying.

The flexible support may also include a release-coated substrate. Such substrates are typically employed when an adhesive transfer tape is provided. Examples of release-coated substrates are well known in the art and include, by way of example, silicone-coated Kraft paper, and the like. Tapes of the disclosure may also incorporate a low adhesion backing (LAB), which are known in the art.

Exemplary Embodiments

1. A crosslinkable composition comprising:
an acid- and epoxy-functional (meth)acrylic copolymer comprising interpolymerized monomers comprising:
an epoxy-functional (meth)acryloyl monomer;
an acid-functional ethylenically unsaturated monomer; and
an optional multifunctional (meth)acrylate crosslinker; and
a chlorinated triazine crosslinking agent;
wherein the epoxy-functional (meth)acryloyl monomer is used in an amount of no greater than 5 parts by weight, and the chlorinated triazine crosslinking agent is used in an amount of no greater than 0.01 part by weight, relative to 100 parts by weight of the total monomer content that would form an unmodified acid-functional (meth)acrylic copolymer.

2. The crosslinkable composition of embodiment 1 wherein the chlorinated triazine crosslinking agent is used in an amount of 0.001 to 0.01 part by weight.

3. The crosslinkable composition of embodiment 1 or 2 wherein the chlorinated triazine crosslinking agent is used in an amount of no greater than 0.005 part by weight.

4. The crosslinkable composition of any one of embodiments 1 through 3 wherein the epoxy-functional (meth)acryloyl monomer is used in an amount of 0.002 to 5 parts by weight.

5. The crosslinkable composition of any one of embodiments 1 through 4 wherein the epoxy-functional (meth)acryloyl monomer is used in an amount of no greater than 1 part by weight.

6. The crosslinkable composition of any one of embodiments 1 through 5 wherein the acid- and epoxy-functional (meth)acrylic copolymer comprises interpolymerized monomers comprising a (meth)acrylic acid ester of a non-tertiary alcohol, an acid-functional ethylenically unsaturated monomer, and an epoxy-functional (meth)acryloyl monomer.

7. The crosslinkable composition of embodiment 6 wherein the acid-functional ethylenically unsaturated monomer is used in an amount of at least 1 part by weight of the 100 parts of the total monomer content that would form an unmodified acid-functional (meth)acrylic copolymer.

8. The crosslinkable composition of embodiment 7 wherein the acid- and epoxy-functional (meth)acrylic copolymer comprises interpolymerized monomers comprising:

85 to 99 parts by weight of a (meth)acrylic acid ester of a non-tertiary alcohol; and 1 to 15 parts by weight of an acid-functional ethylenically unsaturated monomer;

based on 100 parts of the total monomer content that would form an unmodified acid-functional (meth)acrylic copolymer.

9. The crosslinkable composition of embodiment 8 wherein the epoxy-functional (meth)acryloyl monomer is used in an amount of 0.05 to 5 parts by weight.

10. The crosslinkable composition of embodiment 8 or 9 wherein the acid- and epoxy-functional (meth)acrylic copolymer further comprises interpolymerized monomers comprising a non-acid-functional polar monomer and a vinyl monomer.

11. The crosslinkable composition of any one of embodiments 1 through 10 further comprising a multifunctional (meth)acrylate monomer.

12. The crosslinkable composition of any one of embodiments 1 through 11 wherein the chlorinated triazine crosslinking agent is of the formula:

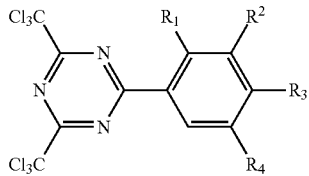

wherein:
$R^1$, $R^2$, $R^3$, and $R^4$ are independently hydrogen, alkyl, or alkoxy; and
1-3 of the $R^1$, $R^2$, $R^3$, and $R^4$ groups are hydrogen.

13. The crosslinkable composition of any one of embodiments 1 through 11 wherein the chlorinated triazine crosslinking agent is of the formula:

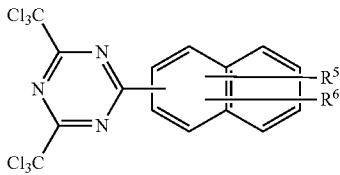

wherein:
$R^5$ and $R^6$ are independently hydrogen, alkyl, or alkoxy.

14. The crosslinkable composition of any one of embodiments 1 through 13 wherein the epoxy-functional (meth)acryloyl monomer is of the formula:

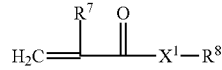

wherein:
$R^7$ is —H or —$CH_3$;
$X^1$ is —O— or —$NR^9$—;
$R^8$ is an epoxy-substituted hydrocarbyl group; and
$R^9$ is —H or a $C_1$-$C_4$ alkyl.

15. The crosslinkable composition of embodiments 1 through 13 wherein the epoxy-functional (meth)acryloyl monomer is of the formula:

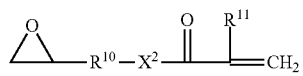

wherein:
$R^{10}$ is a (hetero)hydrocarbyl group (preferably, a hydrocarbyl group);
$R^{11}$ is —H or —$CH_3$;
$X^2$ is —$NR^{12}$— or —O—; and
$R^{12}$ is —H or a $C_1$-$C_4$ alkyl.

16. A crosslinkable composition comprising:
an acid- and epoxy-functional (meth)acrylic copolymer that comprises interpolymerized monomers comprising:
a (meth)acrylic acid ester of a non-tertiary alcohol;
an acid-functional ethylenically unsaturated monomer;
an epoxy-functional (meth)acryloyl monomer;
an optional non-acid-functional polar monomer;
an optional vinyl monomer; and
an optional multifunctional (meth)acrylate crosslinker; and
a chlorinated triazine crosslinking agent;
wherein the epoxy-functional (meth)acryloyl monomer is used in an amount of 0.002 to 5 parts by weight, and the chlorinated triazine crosslinking agent is used in an amount of 0.001 to 0.01 part by weight, relative to 100 parts by weight of the total monomer content that would form an unmodified acid-functional (meth)acrylic copolymer.

17. The crosslinkable composition of embodiment 16 wherein, in addition to the epoxy-functional (meth)acryloyl monomer, the acid- and epoxy-functional (meth)acrylic copolymer comprises interpolymerized monomers comprising:

85 to 99 parts by weight of a (meth)acrylic acid ester of a non-tertiary alcohol;

1 to 15 parts by weight of an acid-functional ethylenically unsaturated monomer;

0 to 10 parts by weight of a non-acid-functional polar monomer;

0 to 5 parts by weight of a vinyl monomer;

based on 100 parts by weight of the (meth)acrylic acid ester of a non-tertiary alcohol, an acid-functional ethylenically unsaturated monomer, optional non-acid-functional polar monomer, and an optional vinyl monomer.

18. The crosslinkable composition of embodiment 16 or 17 wherein the epoxy-functional (meth)acryloyl monomer is used in an amount of 0.05 to 5 parts by weight.

19. The crosslinkable composition of any one of embodiments 16 through 18 wherein the chlorinated triazine crosslinking agent is used in an amount of 0.001 to 0.005 part by weight.

20. The crosslinkable composition of any one of embodiments 16 through 19 wherein the chlorinated triazine crosslinking agent is of the formula:

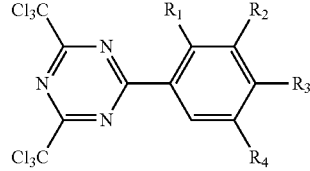

wherein:
$R^1$, $R^2$, $R^3$, and $R^4$ are independently hydrogen, alkyl, or alkoxy; and
1-3 of the $R^1$, $R^2$, $R^3$, and $R^4$ groups are hydrogen.

21. The crosslinkable composition of any one of embodiments 16 through 19 wherein the chlorinated triazine crosslinking agent is of the formula:

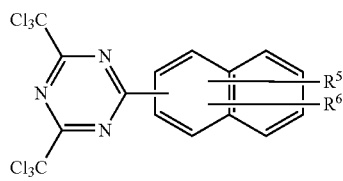

wherein:
$R^5$ and $R^6$ are independently hydrogen, alkyl, or alkoxy.

22. The crosslinkable composition of any one of embodiments 16 through 21 wherein the epoxy-functional (meth)acryloyl monomer is of the formula:

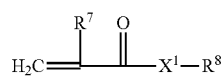

wherein:
$R^7$ is —H or —CH$_3$;
$X^1$ is —O— or —NR$^9$—;
$R^8$ is an epoxy-substituted hydrocarbyl group; and
$R^9$ is —H or a $C_1$-$C_4$ alkyl.

23. The crosslinkable composition of any one of embodiments 16 through 21 wherein the epoxy-functional (meth)acryloyl monomer is of the formula:

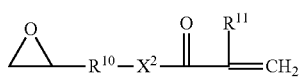

wherein:
$R^{10}$ is a (hetero)hydrocarbyl group (preferably, a hydrocarbyl group);
$R^{11}$ is —H or —CH$_3$;
$X^2$ is —NR$^{12}$— or —O—; and
$R^{12}$ is —H or a $C_1$-$C_4$ alkyl.

24. A crosslinkable composition comprising:
an acid- and epoxy-functional (meth)acrylic copolymer that comprises interpolymerized monomers comprising:
a (meth)acrylic acid ester of a non-tertiary alcohol;
an acid-functional ethylenically unsaturated monomer;
an epoxy-functional (meth)acryloyl monomer;
an optional non-acid-functional polar monomer;
an optional vinyl monomer; and
an optional multifunctional (meth)acrylate crosslinker; and
a chlorinated triazine crosslinking agent;
wherein the epoxy-functional (meth)acryloyl monomer is used in an amount of 0.05 to 5 parts by weight, and the chlorinated triazine crosslinking agent is used in an amount of 0.001 to 0.005 part by weight, relative to 100 parts by weight of the total monomer content that would form an unmodified acid-functional (meth)acrylic copolymer; and
wherein the (meth)acrylic acid ester of a non-tertiary alcohol is used in an amount of 85 to 99 parts by weight, the acid-functional ethylenically unsaturated monomer is used in an amount of 1 to 15 parts by weight, the non-acid-functional polar monomer is used in an amount of 0 to 10 parts by weight, the vinyl monomer is used in an amount of 0 to 5 parts by weight, based on 100 parts by weight of the (meth)acrylic acid ester of a non-tertiary alcohol, an acid-functional ethylenically unsaturated monomer, optional non-acid-functional polar monomer, and an optional vinyl monomer.

25. A crosslinkable syrup composition comprising:
a solute polymer comprising a plurality of interpolymerized monomers comprising pendant acid- and epoxy units;
a component comprising at least one free-radically polymerizable solvent monomer; and
a chlorinated triazine crosslinking agent;
wherein epoxy-functional monomer is used in an amount of no greater than 5 parts by weight the chlorinated triazine crosslinking agent is used in an amount of no greater than 0.01 part by weight, relative to 100 parts by weight of the total monomer content that would form an unmodified acid-functional (meth)acrylic copolymer.

26. The crosslinkable syrup composition of embodiments 25 wherein the interpolymerized monomers comprise an epoxy-functional (meth)acryloyl monomer is of the formula:

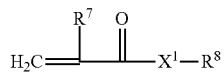

wherein:
$R^7$ is —H or —CH$_3$;
$X^1$ is —O— or —NR$^9$—;
$R^8$ is an epoxy-substituted hydrocarbyl group; and
$R^9$ is —H or a $C_1$-$C_4$ alkyl.

27. The crosslinkable syrup composition of embodiment 25 wherein the interpolymerized monomers comprise an epoxy-functional (meth)acryloyl monomer of the formula:

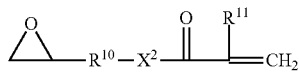

wherein:
$R^{10}$ is a (hetero)hydrocarbyl group (preferably, hydrocarbyl);
$R^{11}$ is —H or —CH$_3$;
$X^2$ is —NR$^{12}$— or —O—; and
$R^{12}$ is —H or a $C_1$-$C_4$ alkyl.

28. The crosslinkable syrup composition of any one of embodiments 25 through 27 wherein the interpolymerized monomers comprise a (meth)acrylic acid ester of a non-tertiary alcohol and an acid-functional ethylenically unsaturated monomer.

29. The crosslinkable syrup of embodiment 28 wherein the interpolymerized monomers further comprise a non-acid-functional polar monomer and a vinyl monomer.

30. The crosslinkable syrup composition of embodiment 28 or 29 wherein the interpolymerized monomers further comprise a multifunctional (meth)acrylate monomer.

31. The crosslinkable syrup composition of any one of embodiments 25 through 30 wherein the chlorinated triazine crosslinking agent is of the formula:

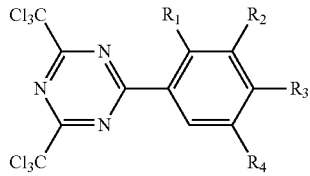

wherein:
$R^1$, $R^2$, $R^3$, and $R^4$ are independently hydrogen, alkyl, or alkoxy; and
1-3 of the $R^1$, $R^2$, $R^3$, and $R^4$ groups are hydrogen.

32. The crosslinkable syrup composition of any one of embodiments 25 through 30 wherein the chlorinated triazine crosslinking agent is of the formula:

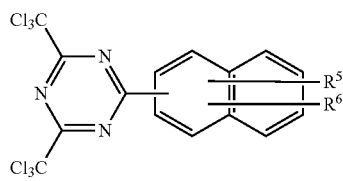

wherein:
$R^5$ and $R^6$ are independently hydrogen, alkyl, or alkoxy.

33. A pressure-sensitive adhesive composition prepared from a crosslinkable composition of any one of embodiments 1 through 24 or a crosslinkable syrup composition of any one of embodiments 25 through 32.

34. A pressure-sensitive adhesive article comprising a coating of the adhesive of embodiment 33 on a backing.

EXAMPLES

Objects and advantages of this disclosure are further illustrated by the following examples, but the particular materials and amounts thereof recited in these examples, as well as other conditions and details, should not be construed to unduly limit this disclosure.

As used herein, "pph" refers to parts per one hundred parts of the monomers that would be in an unmodified acid-functional (meth)acrylic copolymer, e.g., 100 parts of IOA and AA total.

Peel Adhesion Test [ASTM D 3330/D 3330M-04]

The test measures the force required to peel the tape from glass at an angle of 180 degrees. The test was performed on conditioned tapes prepared in the examples using the procedure described in the referenced ASTM Test Methods. A test sample was prepared by adhering a 12.7-millimeter (12.7-mm) wide tape a glass plate and rolling over the tape once with 2-kilogram (2-kg) roller. The tape was tested on a tensile force tester at a platen speed of 12 inches/minute (305 millimeter/minute (mm/min)) and at 90 inches/min (2286 mm/min) Two samples were tested for each example and platen speed. The averaged values were expressed in Newtons per decimeter (N/dm) and in ounces per inch (oz/in).

Shear Strength Test [ASTM D-3654/D 3654M 06]

The test measures the static shear strength of an adhesive tape in minutes at room temperature (RT) and at elevated temperature (70° C.) from when once end of the tape is adhered to a stainless steel plate, suspended at about a 90 degree angle from vertical, and a weight is attached to the free end of the tape.

70° C. Shear:

A test sample was prepared from the conditioned tapes prepared in the examples. A 12.7-mm wide by 25.4-mm long tape was adhered to one edge of a stainless steel plate so that it overlapped the panel by 12.7 mm, and a 2-kg roller was rolled twice over the portion of tape adhered to the panel. A 0.5-kg weight was attached to the free end of the tape, and the panel was suspended at about a 90 degree angle from vertical in an oven set at 70° C. The time, in minutes, for the tape to full away from the panel was measured and the time to failure and the mode of failure was recorded. The failure mode can be adhesive (a) in which the adhesive pulls away cleanly from the panel or the tape backing or cohesive (c) in which the adhesive splits and part of the adhesive is left on the tape and part is left on the tape backing. The test was terminated if failure had not occurred in 10,000 minutes and the results recorded. The data reported was as an arithmetic average of three measurements.

RT Shear:

A test sample was prepared and tested in the same manner as for 70° C. Shear except that a 1-kg weight was attached to the tape and the test panel was suspended in a controlled environment room (23° C./50% Relative Humidity).

Examples 1-9 and Comparative Example C1

Monomer mixtures were prepared for each example by adding 450 grams (g) of isooctyl acrylate (IOA, 90 parts), 50 g of acrylic acid (AA, 10 parts), 0.2 g (0.04 pph) of 2,2-dimethoxy-2-phenylacetophenone photoinitiator (IRGACURE 651 photoinitiator; BASF Corporation; Florham Park, N.J.) to a jar, capping the jar, and purging with nitrogen for 20 minutes. The mixture was exposed to low intensity UV radiation (SYLVANIA F40/350 BL 40 watt fluorescent black lights) until it reached a coatable viscosity (about 5000 cps). The following were added to the mixture, and stirred well after each addition to form a coating composition: (a) 0.8 g (0.16 pph) of photoinitiator (IRGACURE 651 photoinitiator), (b) varying amounts of GA (glycidyl acrylate, Sigma Aldrich, St. Louis, Mo.) or GMA (glycidyl methacrylate, Sigma Aldrich, St. Louis, Mo.) shown in Table 1, and (c) varying amounts of one or both crosslinkers shown in Table 1—TRI (triazine: 2-(3,4-dimethoxyphenyl)-4,6-bis(trichloromethyl))-1,3,5-triazine) or HDDA (1,6-hexanediol diacrylate (Sartomer USA LLC: Exton, Pa.)).

A tape was prepared by knife coating the compositions to a thickness of about 2 mil (about 50 micrometers) on the primed side of a clear polyester film HOSTAPHAN 3SAB polyester film; Mitsubishi Polyester Film, Inc., Greer, S.C.).

An adhesive composition for Example C1 was prepared and coated into tapes in the same manner except that no GMA or GA was added.

For Examples 1-7 and C1, the adhesive was covered with a clear silicone coated film (Silphan S 36 M74A, Siliconature USA, LLC, Chicago, Ill.) and the composite was irradiated with UVA light (500 mJ/cm$^2$) to cure the adhesive.

For Examples 8-9 and C2, the coated film was placed in a chamber with a nitrogen atmosphere and irradiated with UVA light (550 mJ/cm$^2$) to cure the adhesive.

The adhesive coated sheets were cut into tapes and conditioned at 23° C./50% Relative Humidity for 24 hours and then tested for shear strength adhesion on stainless steel at room temperature (RT) and at 70° C., and for 180 degree peel adhesion on glass. Results are shown in Table 1.

TABLE 1

| Ex | GA or GMA-amt Type-g (pph) | Crosslinker-amt Type-pph | Static Shear min | | 180° Peel- N/dm (oz/in) | |
|---|---|---|---|---|---|---|
| | | | RT | 70° C. | 12 in/min | 90 in/min |
| 1 | GA-2.5 (0.5) | TRI-0.005 | 10000 | 10000 | 79 (72) | 108 (99) |
| 2 | GA-2.5 (0.5) | TRI-0.005 HDDA-0.08 | 10000 | 10000 | 78 (71) | 103 (94) |
| 3 | GMA-2.5 (0.5) | TRI-0.005 | 10000 | 10000 | 76 (69) | 101 (92) |

TABLE 1-continued

| Ex | GA or GMA-amt Type-g (pph) | Crosslinker-amt Type-pph | Static Shear min RT | Static Shear min 70° C. | 180° Peel-N/dm (oz/in) 12 in/min | 180° Peel-N/dm (oz/in) 90 in/min |
|---|---|---|---|---|---|---|
| 4 | GMA-2.5 (0.5) | TRI-0.005 HDDA-0.08 | 10000 | 10000 | 79 (72) | 106 (97) |
| 5 | GMA-2.5 (0.5) | TRI-0.002 HDDA-0.08 | 10000 | 10000 | 72 (66) | 107 (98) |
| 6 | GMA-0.5 (0.1) | TRI-0.002 HDDA-0.08 | 6240 (c) | 10000 | 77 (70) | 103 (94) |
| 7 | GMA-0.025 (0.005) | TRI-0.002 HDDA-0.08 | 5030 (c) | 870 (c) | 74 (68) | 101 (92) |
| 8 | GMA-2.5 (0.5) | TRI-0.005 | 995 (c) | 10000 | 81 (74) | 107 (98) |
| 9 | GMA-2.5 (0.5) | TRI-0.005 HDDA-0.08 | 10000 | 10000 | 70 (64) | 102 (93) |
| C1 | None | TRI-0.005 | 1121 (c) | 171 (c) | 78 (71) | 99 (90) |
| C2 | None | TRI-0.005 | 662 (c) | 32 (c) | 77 (70) | 105 (96) |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

We claim:

1. A crosslinkable composition comprising:
   a syrup composition comprising a solution of a solute polymer in one or more solvent monomers, wherein the solute polymer comprises an unmodified acid-functional (meth)acrylic copolymer lacking epoxy functionality and formed from a monomer mixture comprising an acid-functional ethylenically unsaturated monomer and an optional multifunctional (meth)acrylate crosslinker and wherein the solvent monomer comprise an epoxy-functional (meth)acryloyl monomer;
   a chlorinated triazine crosslinking agent;
   wherein the epoxy-functional (meth)acryloyl monomer is used in an amount of no greater than 5 parts by weight, and the chlorinated triazine crosslinking agent is used in an amount of 0.001 to 0.002 part by weight, relative to 100 parts by weight of the total monomer content that would form the unmodified acid-functional (meth) acrylic copolymer.

2. The crosslinkable composition of claim 1 wherein the epoxy-functional (meth)acryloyl monomer is used in an amount of no greater than 1 part by weight.

3. The crosslinkable composition of claim 1 wherein the monomer mixture further comprises a (meth)acrylic acid ester of a non-tertiary alcohol.

4. The crosslinkable composition of claim 3 wherein the monomer mixture comprises:
   85 to 99 parts by weight of a (meth)acrylic acid ester of a non-tertiary alcohol; and
   1 to 15 parts by weight of an acid-functional ethylenically unsaturated monomer;
   based on 100 parts of the total monomer content that would form the unmodified acid-functional (meth)acrylic copolymer.

5. The crosslinkable composition of claim 4 wherein the epoxy-functional (meth)acryloyl monomer is used in an amount of 0.05 to 5 parts by weight based on the total monomer content that would form the unmodified acid-functional (meth)acrylic copolymer.

6. The crosslinkable composition of claim 1 wherein the monomer mixture further comprises a vinyl monomer.

7. The crosslinkable composition of claim 1 wherein the monomer mixture comprises a multifunctional (meth)acrylate monomer.

8. The crosslinkable composition of claim 1 wherein the chlorinated triazine crosslinking agent is of the formula:

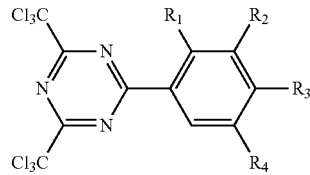

wherein:
R$^1$, R$^2$, R$^3$, and R$^4$ are independently hydrogen, alkl, or alkoxy; and
1-3 of the R$^1$, R$^2$, R$^3$, and R$^4$ groups are hydrogen.

9. The crosslinkable composition of claim 1 wherein the chlorinated triazine crosslinking agent is of the formula:

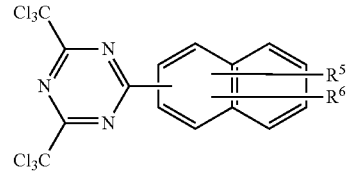

wherein: R$^5$ and W are independently hydrogen, alkyl, or alkoxy.

10. The crosslinkable composition of claim 1 wherein the epoxy-functional (meth)acryloyl monomer is of the formula:

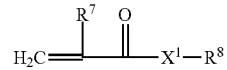

wherein:
R$^7$ is —H or —CH$_3$;
X$^1$ is —O— or —NR$^9$—;
R$^8$ is an epoxy-substituted hydrocarbyl group; and
R$^9$ is —H or a C$_1$-C$_4$ alkyl.

11. The crosslinkable composition of claim 1 wherein the epoxy-functional (meth)acryloyl monomer is of the formula:

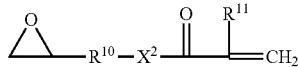

wherein:
R$^{10}$ is a (hetero)hydrocarbyl group;
R$^{11}$ is —H or —CH$_3$;
X$^2$ is —NR$^{12}$— or —O—; and
R$^{12}$ is —H or a C$_1$-C$_4$ alkyl.

12. A crosslinkable composition comprising:
   a syrup composition comprising a solution of a solute polymer in one or more solvent monomers, wherein the solute polymer comprises an unmodified acid-functional (meth)acrylic copolymer lacking epoxy functionality and formed from a monomer mixture comprising (1) a (meth)acrylic acid ester of a non-tertiary alcohol, (2) an acid-functional ethylenically unsaturated monomer, (3) an optional non-acid-functional polar monomer, (4) an optional vinyl monomer, and (5) an optional multifunctional (meth)acrylate crosslinker and wherein the solvent monomer comprise an epoxy-functional (meth)acryloyl monomer; and a chlorinated triazine crosslinking agent;

wherein the epoxy-functional (meth)acryloyl monomer is used in an amount of 0.002 to 5 parts by weight, and the chlorinated triazine crosslinking agent is used in an amount of 0.001 to 0.002 part by weight, relative to 100 parts by weight of the total monomer content that would form the unmodified acid-functional (meth)acrylic copolymer.

13. The crosslinkable composition of claim 12 wherein the monomer mixture comprises:

85 to 99 parts by weight of the (meth)acrylic acid ester of the non-tertiary alcohol;

1 to 15 parts by weight of the acid-functional ethylenically unsaturated monomer;

0 to 10 parts by weight of the optional non-acid-functional polar monomer;

0 to 5 parts by weight of the optional vinyl monomer;

based on 100 parts by weight of the (meth)acrylic acid ester of a non-tertiary alcohol, acid-functional ethylenically unsaturated monomer, optional non-acid-functional polar monomer, and optional vinyl monomer.

14. A crosslinkable composition comprising:

a syrup composition comprising a solution of a solute polymer in one or more solvent monomers, wherein the solute polymer comprises an unmodified acid-functional (meth)acrylic copolymer lacking epoxy functionality and formed from a monomer mixture comprising (1) a (meth)acrylic acid ester of a non-tertiary alcohol, (2) an acid-functional ethylenically unsaturated monomer, (3) an optional non-acid-functional polar monomer, (4) an optional vinyl monomer, and (5) an optional multifunctional (meth)acrylate crosslinker and wherein the solvent monomer comprise an epoxy-functional (meth)acryloyl monomer; and a chlorinated triazine crosslinking agent;

wherein the epoxy-functional (meth)acryloyl monomer is used in an amount of 0.05 to 5 parts by weight, and the chlorinated triazine crosslinking agent is used in an amount of 0.001 to 0.002 part by weight, relative to 100 parts by weight of the total monomer content that would form an unmodified acid-functional (meth)acrylic copolymer; and wherein the (meth)acrylic acid ester of the non-tertiary alcohol is used in an amount of 85 to 99 parts by weight, the acid-functional ethylenically unsaturated monomer is used in an amount of 1 to 15 parts by weight, the optional non-acid-functional polar monomer is used in an amount of 0 to 10 parts by weight, the optional vinyl monomer is used in an amount of 0 to 5 parts by weight, based on 100 parts by weight of the (meth)acrylic acid ester of a non-tertiary alcohol, the acid-functional ethylenically unsaturated monomer, the optional non-acid-functional polar monomer, and the optional vinyl monomer.

* * * * *

UNITED STATES PATENT AND TRADEMARK OFFICE
CERTIFICATE OF CORRECTION

| | | |
|---|---|---|
| PATENT NO. | : 9,260,638 B2 | Page 1 of 1 |
| APPLICATION NO. | : 13/990130 | |
| DATED | : February 16, 2016 | |
| INVENTOR(S) | : Krepski et al. | |

It is certified that error appears in the above-identified patent and that said Letters Patent is hereby corrected as shown below:

In the Specification

Column 1
Line 10, after "entirety" insert -- . --.

Column 6
Line 32, delete "naphthenyl" and insert -- naphthyl --, therefor.

Line 33, delete "naphthenyl" and insert -- naphthyl --, therefor.

Column 19
Line 48, after "mm/min)" insert -- . --.

In the Claims

Column 22
Line 22 (approx.), in Claim 8, delete "alkl," and insert -- alkyl, --, therefor.

Line 37 (approx.), in Claim 9, delete "Ware" and insert -- $R^6$ are --, therefor.

Signed and Sealed this
Twenty-third Day of August, 2016

Michelle K. Lee
*Director of the United States Patent and Trademark Office*